UNITED STATES PATENT OFFICE.

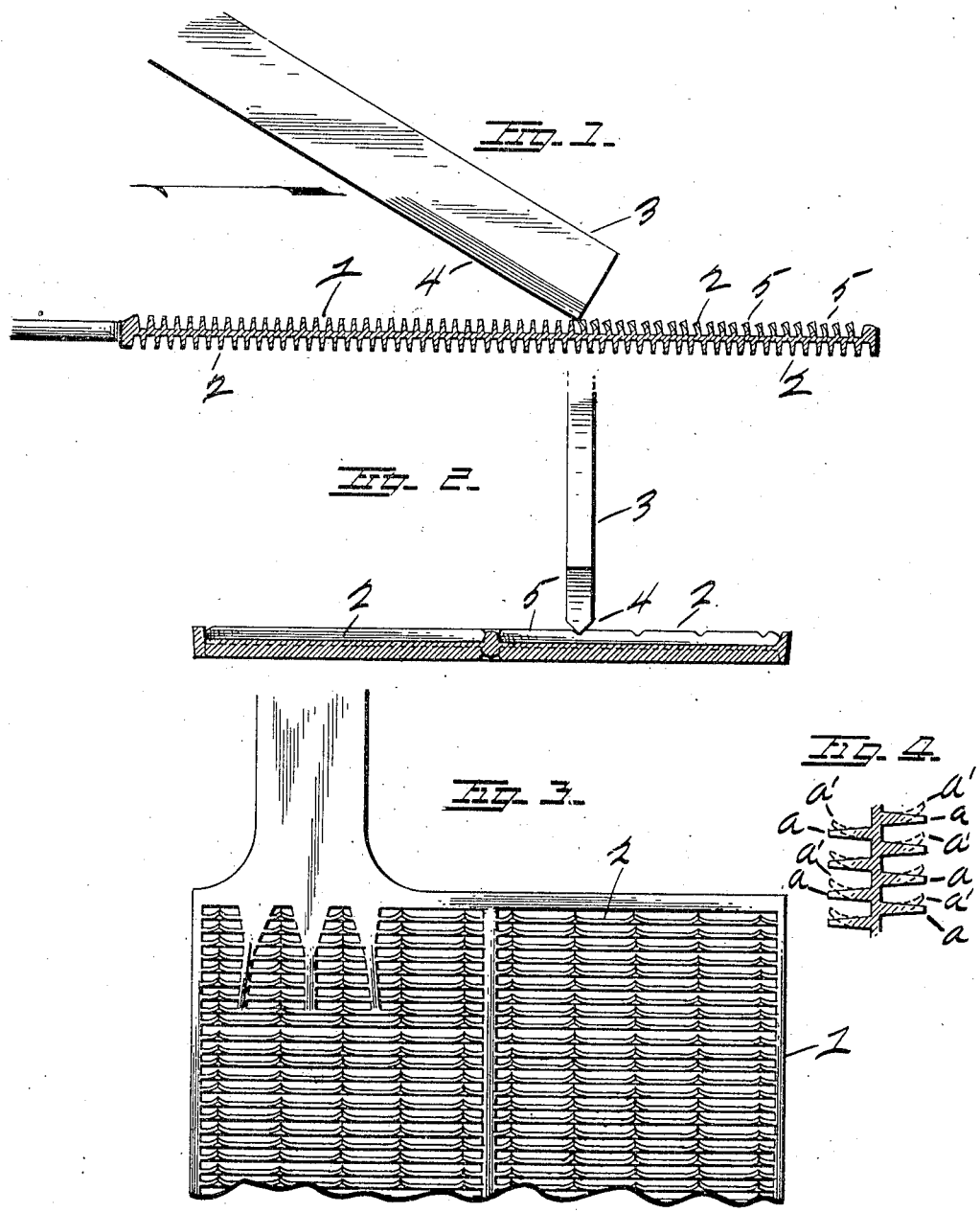

GEORGE J. MILLER, OF TOLEDO, OHIO.

METHOD OF MAKING BATTERY-PLATES.

No. 926,278.

Specification of Letters Patent.

Patented June 29, 1909.

Application filed August 27, 1906. Serial No. 332,129.

*To all whom it may concern:*

Be it known that I, GEORGE J. MILLER, of Toledo, county of Lucas, and State of Ohio, have invented certain new and useful Improvements in Methods of Making Battery-Plates; and I do hereby declare that the following is a full, clear, and exact description thereof, which will enable others skilled in the art to which it appertains to make and use the same, reference being had to the accompanying drawings, and to the characters of reference marked thereon, which form part of this specification.

This invention has reference to an improved method of making plates for use in electric batteries; and it has for its object to provide an improved method in the manufacture of battery electrodes by which the active material shall be made to firmly adhere to the electrode and when once in position shall be positively held against displacement.

The invention has particular reference to an improvement in the methods of making electrodes for storage batteries in which each face of the lead plate forming the grid is provided with a plurality of transverse ribs adapted to hold the active material between the faces thereof.

The method by which I have heretofore constructed battery plates is fully set forth in Letters Patent issued to me June 11th, 1901, No. 676,334. In practicing the method set forth in said patent, the ribs of the plate are substantially perpendicular to the central body or core, the side faces of the ribs being slightly inclined to permit the plates to be withdrawn from the dies between which they are formed. I find in thus forming a plate on opposite faces with ribs having slightly inclined side faces, that the active material in the form of a plastic mass after being forced between the ribs is liable to become dislodged, the dislodgment occurring to a greater extent at the ends adjacent to the side margins of the plate, the efficiency of the battery being as a consequence impaired.

In the practice of my improved method the active material, after being lodged between the ribs is positively held in place, being practically insured against dislodgment from either chemical or mechanical action.

In the accompanying drawings Figure 1 is a view illustrating a means for carrying out my improved method, the battery plate being shown in longitudinal sections; Fig. 2 is a view to further illustrate my method, the plate being in transverse section; Fig. 3 is a face view of the upper portion only of a battery plate constructed according to my improved method, the same being shown in readiness to receive the active material. Fig. 4 is an enlarged section showing the original and altered position of the ribs of the plate before and after being operated upon.

Referring to the drawings, 1 indicates a lead plate provided with ribs 2 disposed in planes transverse to the body. In performing my improved method I take a battery plate 1 after it has been formed by suitable die faces with ribs 2, and by employing a suitable tool 3, either manually or mechanically operated and having a blunt scoring face 4, I draw the same at an inclination in an upward direction across the ridges 5 of the ribs 2, as indicated by the arrow Fig. 1. This operation may be repeated at suitable distances across the face of the plate, or the several scoring operations may be performed simultaneously by employing a plurality of tools arranged side by side and operating in unison.

By drawing the tool over the face of the plate in contact with the ridges of the ribs the latter are deflected from their original position *a* Fig. 4, to the position *a'* indicated by dotted lines, so that after being thus deflected the active material will be firmly held in place after being lodged in the space between the ribs.

By means of my improved method I am enabled to produce a battery plate which is inexpensive to manufacture and which is extremely durable, being capable of sustaining rough mechanical usage without danger of dislodging the active material supported thereby.

Having described my invention, what I claim and desire to secure by Letters Patent, is:—

1. The improvement in the methods of making battery plates provided with transverse ribs, which consists in scoring the plate across the ribs transversely to said ribs.

2. The improvement in the methods of making battery plates provided with transverse ribs, which consists in scoring the plate at short distances apart to deflect the ridges of said ribs.

In testimony, that I claim the foregoing as my own I affix my signature, in presence of two witnesses.

GEO. J. MILLER.

Witnesses:
CARL H. KELLER,
ALICE M. DRURY.